United States Patent [19]

Arai

[11] Patent Number: 4,655,922

[45] Date of Patent: * Apr. 7, 1987

[54] WIRE LOCKING STRUCTURE FOR A FILTER DEVICE

[75] Inventor: Koichi Arai, Kanagawa, Japan

[73] Assignee: Arai Machinery Corporation, Japan

[*] Notice: The portion of the term of this patent subsequent to Feb. 11, 2003 has been disclaimed.

[21] Appl. No.: 799,445

[22] Filed: Nov. 19, 1985

Related U.S. Application Data

[63] Continuation of Ser. No. 638,659, Aug. 7, 1984, Pat. No. 4,569,763.

[30] Foreign Application Priority Data

Aug. 15, 1983 [JP] Japan .................................. 58-148033

[51] Int. Cl.⁴ ............................................... E03B 3/18
[52] U.S. Cl. ................................. 210/497.1; 29/452; 29/526 R; 166/231; 166/233; 210/232; 242/125.1; 403/317

[58] Field of Search ................ 29/163.5 F, 163.5 CW, 29/452, 526 R; 242/117, 125.1, 125.2; 403/317, 318; 166/231, 232, 233; 210/232, 460, 461, 462, 463, 494.2, 497.01, 497.1

[56] References Cited

U.S. PATENT DOCUMENTS

| | | | |
|---|---|---|---|
| 2,615,651 | 10/1952 | Johnson | 242/125.1 |
| 2,726,827 | 12/1955 | Ammerall | 242/125.1 |
| 3,937,281 | 2/1976 | Harnsberger | 210/497.1 |
| 3,958,634 | 5/1976 | Smith | 210/497.1 |
| 4,284,138 | 8/1981 | Allred | 166/233 |
| 4,428,423 | 1/1984 | Koehler | 166/231 |
| 4,569,763 | 2/1986 | Arai | 210/497.1 |

Primary Examiner—Ernest G. Therkorn
Attorney, Agent, or Firm—Louis E. Marn

[57] ABSTRACT

This invention relates to a wire locking structure for a filter device, in which an outer circumference of a cylinder body is provided with a screw thread portion. The screw thread portion is wrapped by a wire of isosceles triangle in section. An end of the wire is drawn into a recess and firmly supported in a U-shape by an insert member to be inserted in the recess, thereby a conventional welding means has been removed.

3 Claims, 4 Drawing Figures

WIRE LOCKING STRUCTURE FOR A FILTER DEVICE

This is a continuation of application Ser. No. 638,659 filed Aug. 7, 1984, now U.S. Pat. No. 4,569,763.

BACKGROUND OF THE INVENTION

This invention relates to a wire locking structure for a filter device.

Referring to a filter device whose cylinder body is wrapped by a wire, both ends of the wire are fixed with an external circumference of the cylinder body by a conventional welding means.

However, the disadvantage of the conventional welding means is that the cylinder body and the wire may be deformed or deteriorated in quality due to high heating of welding. Further, there is the possibility that the wire may be extended due to thermal expansion, thereby a clearance gap between adjacent slits S may be deformed irregularly.

Still further, it is a cumbersome work to remove paddings in connection with welding.

BRIEF SUMMARY OF THE INVENTION

It is an object of this invention to provide a wire locking structure for a filter device, in which an end portion of the wire is drawn into a recess and firmly supported by an insert member to be inserted in the recess, thereby a conventional welding means has been removed.

Other and further objects, features and advantages of this invention will appear more fully from the following description in connection with the accompanying drawings.

BRIEF DESCRIPTION OF THE ACCOMPANYING DRAWINGS

PREFERRED EXAMPLE OF THE INVENTION

A preferred example of this invention will be described with reference to the accompanying drawings.

Figure 1:
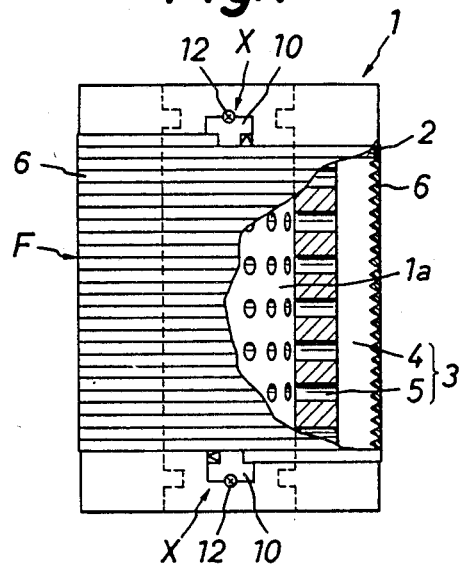
FIG. 1 is a partially cutaway front view of a filter device, in which a wire locking structure according to this invention is disposed.
Figure 2:
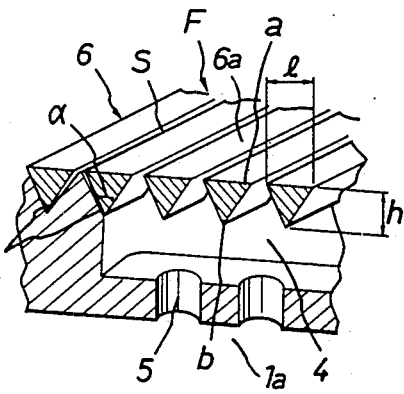
FIG. 2 is a partially cutaway section view of a longitudinal passage, a wrapped wire and other components which are formed in the filter device in FIG. 1.

Referring first to FIG. 1, a filter device F comprises a cylinder body 1 having a cavity 1a, a screw thread portion 2 formed on the outer circumference of the cylinder body 1, a plurality of longitudinal passages 4 formed on the outer circumference and spaced with each other and a plurality of lateral paths 5 spaced with each other and communicated with the cavity 1a and the plurality of longitudinal passages 4.

Numeral 6 is a metal wire of which cross-section is an isosceles triangle. The wire 6 consists of a base a of length 1, a bottom surface 6a and a summit b of height h. It is wrapped up between two flanks of the screw thread portion 2 in such a manner that the summit b of the wire 2 is fit in a screw bottom 2a thereof. Thus, a base portion of the wire 6 forms a nearly flattened surface of the cylinder body 1. Thus, a slit S is formed in a spiral form between adjacent wires 6 and a filter device F is formed.

Figure 3A:
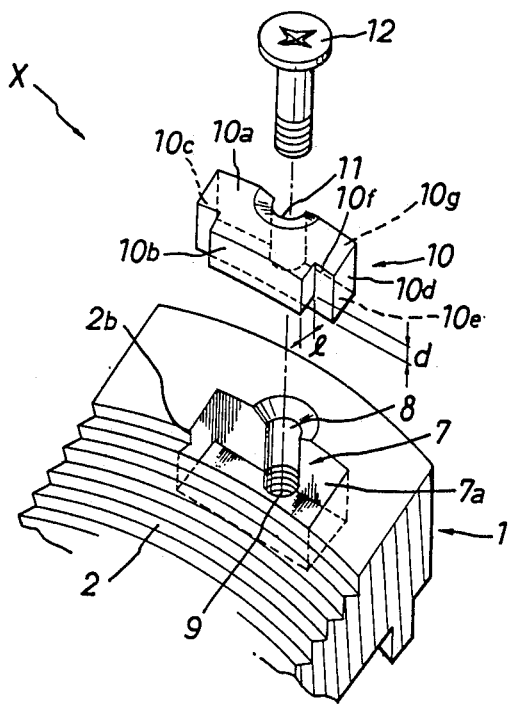
FIG. 3A is an exploded view of a wire locking structure for a filter device according to this invention.
Figure 3B:
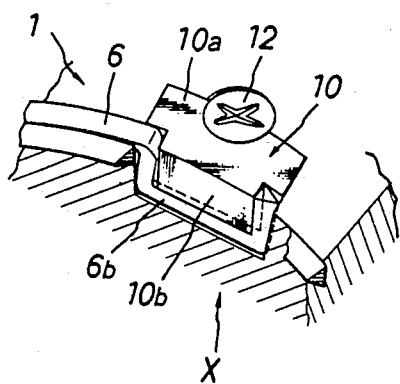
FIG. 3B is a perspective view of the wire locking structure, in which an end portion of a wire is locked in a U-shape.

FIGS. 3A and 3B respectively show an exploded view and a perspective view of a wire locking structure X for locking an end portion 6b of the wire 6 to be wrapped up round the outer circumference of the filter device F.

First of all, the end portion 6b of the wrapped wire 6 will be referred to. The end portion 6b thereof contacts a last corner 2b of the screw thread portion 2 and is disposed at the bottom of a recess 7. Numeral 8 is a half counter-sunk hole formed in the recess 7 and numeral 9 is a screwed portion formed at the end of the half counter-sunk hole 8.

Numeral 10 is an insert member which is, as shown in FIG. 3B, inserted into the recess 7. A top 10a of the insert member 10 forms a curved portion identical with an outer circumference of the cylinder body 1. The insert member 10 has a pair of cutaway portions 10f at both sides 10c, 10d thereby a projecting portion 10b is formed. The projecting portion 10b is also cutaway at depth d so as to draw the wire 6 into the depth d portion. Further, the length 1 of the projecting portion 10b is equivalent to that of the wire 6. Thus, the cutaway portion 10f forms a U-shape. Still further, along a rear side 10g of the insert member 10 is formed a half sunk hole 11.

Numeral 12 is a locking bolt for fixing the insert member 10 with the wire 6 which is fit in the recess 7.

A process for locking the end portion 6b of the wire 6 will be described with reference to FIGS. 3A and 3B.

The end portion 6b of the wire 6 is drawn into the bottom of the recess 7 by way of the last corner 2b of the screw thread portion 2. Next to this, the insert member 10 is inserted into the recess 7 and the wire 6 is fit in the cutaway portion 10f of the insert member 10 in U-shape as shown in FIG. 3B.

Then, a right counter-sunk bolt is formed by combining the half counter-sunk hole 8 with the counter sunk hole 11. Subsequently, the bolt 12 is screwed and firmly locked in the counter-sunk hole. Then, the summit b of the wire 6 is collapsed in the screw bottom 2a due to strong clamping. Accordingly, the wire 6 is fixed in the recess 7 more firmly. An edge of the end portion 6d is cut off so as to conform to the surface of the cylinder 1.

Thus, the wire locking structure X according to this invention is formed. As shown in FIG. 1, it is disposed at the beginning part of the wire 6 as well as at the last part thereof, namely at the upper side of the cylinder 1 as well as at the lower side thereof.

It is optional to form the recess 7 and the insert member 10 in a semicolumnar form.

Thus, the end portion of the wire is firmly supported in U-shape by the insert member, so that a width between adjacent slits is maintained uniformly.

What is claimed is:

1. A wire locking structure for a filter device, comprising:
   a cylinder body having a plurality of passages formed on an outer circumference thereof, said plurality of passages communicating with a cavity of said cylinder;
   a screw thread portion formed on said outer circumference containing screw bottoms;
   a wire wrapped around said screw thread by inserting said wire towards said screw bottoms of said screw thread portion;

a recess in said cylinder body for an end portion of said wire;

an insert member for said recess including a cutaway portion for receiving an end portion of said wire; and bolt means to secure said insert member within said recess.

2. The wire locking structure as defined in claim 1 wherein said body proximate said recess and said insert member are formed with cooperating counter-sunk hole portions.

3. The wire locking structure as defined in claim 2 wherein said locking means is a threaded bolt for positioning within a counter-sunk hole formed by said cooperating counter-sunk hole portions.